US012794014B2

(12) United States Patent
Lee et al.

(10) Patent No.: US 12,794,014 B2
(45) Date of Patent: Nov. 10, 2026

(54) ELECTROLYTE FOR RECHARGEABLE LITHIUM BATTERY AND RECHARGEABLE LITHIUM BATTERY INCLUDING THE SAME

(71) Applicant: SAMSUNG SDI CO., LTD., Yongin-si (KR)

(72) Inventors: Tae Jin Lee, Yongin-si (KR); Sanghyung Kim, Yongin-si (KR); Minseo Kim, Yongin-si (KR); Myungheui Woo, Yongin-si (KR); Hyejin Park, Yongin-si (KR); Sanghoon Kim, Yongin-si (KR); Dahyun Kim, Yongin-si (KR); Bokyung Ryu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 741 days.

(21) Appl. No.: 18/004,048

(22) PCT Filed: Apr. 6, 2022

(86) PCT No.: PCT/KR2022/004926
§ 371 (c)(1),
(2) Date: Dec. 30, 2022

(87) PCT Pub. No.: WO2023/003133
PCT Pub. Date: Jan. 26, 2023

(65) Prior Publication Data

US 2024/0120540 A1 Apr. 11, 2024

(30) Foreign Application Priority Data

Jul. 22, 2021 (KR) ........................ 10-2021-0096465

(51) Int. Cl.

| | |
|---|---|
| ***H01M 10/0567*** | (2010.01) |
| ***H01M 4/36*** | (2006.01) |
| ***H01M 4/38*** | (2006.01) |
| ***H01M 4/525*** | (2010.01) |
| ***H01M 4/583*** | (2010.01) |
| ***H01M 10/42*** | (2006.01) |
| *H01M 4/02* | (2006.01) |
| *H01M 10/052* | (2010.01) |

(52) U.S. Cl.
CPC ....... *H01M 10/0567* (2013.01); *H01M 4/366* (2013.01); *H01M 4/386* (2013.01); *H01M 4/525* (2013.01); *H01M 4/583* (2013.01); *H01M 10/4235* (2013.01); *H01M 2004/027* (2013.01); *H01M 2004/028* (2013.01); *H01M 10/052* (2013.01)

(58) Field of Classification Search
None
See application file for complete search history.

(56) References Cited

U.S. PATENT DOCUMENTS

| | | | | |
|---|---|---|---|---|
| 2010/0310944 | A1 | 12/2010 | Kang et al. | |
| 2015/0243969 | A1 | 8/2015 | Ku et al. | |
| 2016/0372788 | A1 | 12/2016 | Cheng et al. | |
| 2018/0309158 | A1 | 10/2018 | Cheng et al. | |
| 2020/0044241 | A1 * | 2/2020 | Gigler | H01M 4/1395 |
| 2020/0212486 | A1 * | 7/2020 | Xu | H01M 10/0569 |
| 2020/0249307 | A1 | 8/2020 | Liu | |

FOREIGN PATENT DOCUMENTS

| | | | | |
|---|---|---|---|---|
| CN | 101507041 | A | 8/2009 | |
| CN | 108064425 | A | 5/2018 | |
| JP | 2013038000 | A | 2/2013 | |
| JP | 2018-037389 | A | 3/2018 | |
| KR | 10-0866766 | B1 | 11/2008 | |
| KR | 10-2018-0028000 | A | 3/2018 | |
| KR | 20180028000 | A * | 3/2018 | H01M 10/0525 |
| KR | 10-2192087 | B1 | 12/2020 | |

OTHER PUBLICATIONS

English Translation of KR2018028000A (Year: 2018).*
EPO Extended European Search Report dated Sep. 10, 2024, issued in corresponding European Patent Application No. 22846005.1 (8 pages).
International Search Report for corresponding PCT/KR2022/004926, Jul. 18, 2022, 3 pp.
Notice of Allowance dated Aug. 24, 2026 in corresponding Korean Patent Application No. 10-2023-7022164, 3 pages.
Office action dated Jun. 30, 2026, in corresponding Chinese Patent Application No. 202280013929.0, 10 pages.

* cited by examiner

*Primary Examiner* — Jonathan Johnson
(74) *Attorney, Agent, or Firm* — Womble Bond Dickinson (US) LLP

(57) ABSTRACT

Disclosed are an electrolyte for a rechargeable lithium battery and a rechargeable lithium battery including the same, the electrolyte including a non-aqueous organic solvent, a lithium salt, and an additive, wherein the additive is a composition including a first compound and a second compound, the first compound is a cesium salt compound, and the second compound is represented by Chemical Formula 1.
Details of Chemical Formula 1 are as described in the specification.

18 Claims, 5 Drawing Sheets

ELECTROLYTE FOR RECHARGEABLE LITHIUM BATTERY AND RECHARGEABLE LITHIUM BATTERY INCLUDING THE SAME

CROSS-REFERENCE TO RELATED APPLICATIONS

This application is a U.S. National Phase Patent Application of International Application Number PCT/KR2022/004926, filed on Apr. 6, 2022, which claims priority of Korean Patent Application Number 10-2021-0096465, filed on Jul. 22, 2021, the entire content of each of which is incorporated herein by reference.

TECHNICAL FIELD

This disclosure relates to an electrolyte for a rechargeable lithium battery and a rechargeable lithium battery including the same.

BACKGROUND ART

A rechargeable lithium battery may be recharged and has three or more times as high energy density per unit weight as a conventional lead storage battery, nickel-cadmium battery, nickel hydrogen battery, nickel zinc battery and the like. It may be also charged at a high rate and thus, is commercially manufactured for a laptop, a cell phone, an electric tool, an electric bike, and the like, and researches on improvement of additional energy density have been actively made.

Such a rechargeable lithium battery is manufactured by injecting an electrolyte into a battery cell, which includes a positive electrode including a positive electrode active material capable of intercalating/deintercalating lithium ions and a negative electrode including a negative electrode active material capable of intercalating/deintercalating lithium ions.

The electrolyte serves as a medium for moving lithium ions between the negative electrode and the positive electrode, and may generally include an organic solvent in which lithium salt is dissolved, and this electrolyte is important in determining stability and performance of a rechargeable lithium battery.

The electrolyte may universally include, for example, a mixed solvent of high dielectric cyclic carbonates such as propylene carbonate and ethylene carbonate and chain carbonates such as diethyl carbonate, ethyl methyl carbonate and dimethyl carbonate in which a lithium salt such as $LiPF_6$, $LiBF_4$, or LiFSI is added. As the development of batteries in various fields is activated, the development of batteries having high output and high stability in a wide temperature range is becoming more important. In terms of the electrolyte, it is important to develop an optimal combination of an organic solvent and additives capable of providing high output, long cycle-life characteristics, high-temperature storage characteristics, and suppressing swelling, decrease in capacity, and increase in resistance.

DISCLOSURE

Technical Problem

An embodiment provides an electrolyte for a rechargeable lithium battery having excellent high-temperature safety.

Another embodiment provides a rechargeable lithium battery having improved high-temperature storage characteristics, cycle-life characteristics, and safety by applying the electrolyte.

Technical Solution

An embodiment of the present invention provides an electrolyte for a rechargeable lithium battery including a non-aqueous organic solvent, a lithium salt, and an additive, wherein the additive is a composition including a first compound and a second compound, the first compound is a cesium salt compound, and the second compound is represented by Chemical Formula 1.

[Chemical Formula 1]

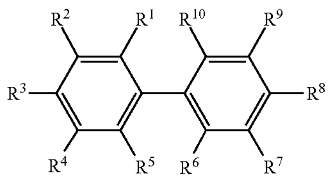

In Chemical Formula 1, $R^1$ to $R^{10}$ are each independently hydrogen, a halogen, a cyano group, a nitro group, an isocyanate group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C3 to C20 cycloalkenyl group, a substituted or unsubstituted C3 to C20 cycloalkynyl group, a substituted or unsubstituted C6 to C30 aryl group, a substituted or unsubstituted C2 to C30 heterocyclic group, a sulfate group ($—OSO_3R^a$), a sulfite group ($—OSO_2R^b$), a sulfonate group ($—SO_3R^c$), a sulfide group ($—SR^d$), an amine group ($—NR^eR^f$), an amide group ($—C(O)NR^gR^h$), or an acyl group ($—C(O)R^i$), wherein, $R^a$, $R^b$, $R^c$, $R^d$, $R^e$, $R^f$, $R^g$, $R^h$, and $R^i$ are each independently hydrogen or a substituted or unsubstituted C1 to C10 alkyl group.

An anion of the cesium salt compound may be an imide-based anion or a phosphate-based anion.

The cesium salt compound may be represented by Chemical Formula 2 or Chemical Formula 3.

[Chemical Formula 2]

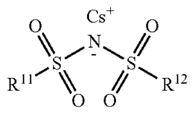

[Chemical Formula 3]

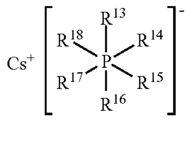

In Chemical Formula 2 and Chemical Formula 3, $R^{11}$ to $R^{18}$ are independently fluoro group, or a C1 to C4 fluoroalkyl group substituted with at least one fluoro group.

Chemical Formula 2 may be represented by Chemical Formula 2-1 or Chemical Formula 2-2.

[Chemical Formula 2-1]

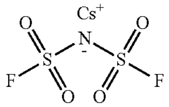

[Chemical Formula 2-2]

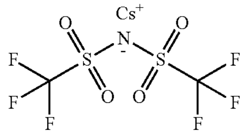

Chemical Formula 3 may be represented by Chemical Formula 3-1.

[Chemical Formula 3-1]

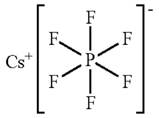

The first compound may be included in an amount of 0.05 to 5.0 parts by weight based on 100 parts by weight of the electrolyte for the rechargeable lithium battery.

In Chemical Formula 1, $R^1$ to $R^{10}$ may each independently be hydrogen, a halogen, a cyano group, a nitro group, an isocyanate group, a substituted or unsubstituted C1 to C20 alkyl group, a substituted or unsubstituted C3 to C20 cycloalkyl group, a substituted or unsubstituted C6 to C30 aryl group, a sulfate group ($—OSO_3R^a$), a sulfite group ($—OSO_2R^b$), a sulfonate group ($—SO_3R^c$), a sulfide group ($—SR^d$), an amine group ($—NR^eR^f$), an amide group ($—C(O)NR^gR^h$), or an acyl group ($—C(O)R^i$), wherein, $R^a$, $R^b$, $R^c$, $R^d$, $R^e$, $R^f$, $R^g$, $R^h$, and $R^i$ may each independently be hydrogen, or a substituted or unsubstituted C1 to C10 alkyl group.

In Chemical Formula 1, $R^1$ to $R^{10}$ may each independently be hydrogen, fluoro, a cyano group, a nitro group, an isocyanate group, a substituted or unsubstituted C1 to C10 alkyl group, a substituted or unsubstituted C6 to C12 aryl group, a sulfate group ($—OSO_3R^a$), a sulfite group ($—OSO_2R^b$), a sulfonate group ($—SO_3R^c$), a sulfide group ($—SR^d$), an amine group ($—NR^eR^f$), an amide group ($—C(O)NR^gR^h$), or an acyl group ($—C(O)R^i$), wherein, $R^a$, $R^b$, $R^c$, $R^d$, $R^e$, $R^f$, $R^g$, $R^h$, and $R^i$ may each independently be hydrogen, or a substituted or unsubstituted C1 to C5 alkyl group.

The second compound may be included in an amount of 0.1 to 10.0 parts by weight based on 100 parts by weight of the electrolyte for the rechargeable lithium battery.

The composition may include the first compound and the second compound in a weight ratio of 1:0.1 to 1:30.

The composition may include the first compound and the second compound in a weight ratio of 1:0.4 to 1:20.

The composition may be included in an amount of 0.5 to 10.0 parts by weight based on 100 parts by weight of the electrolyte for the rechargeable lithium battery.

Another embodiment of the present invention provides a rechargeable lithium battery including a positive electrode including a positive electrode active material, a negative electrode including a negative electrode active material, and the aforementioned electrolyte for the rechargeable lithium battery.

The positive electrode active material may be represented by Chemical Formula 6.

$Li_xM^1_yM^2_zM^3_{1-y-z}O_{2-a}X_a$ [Chemical Formula 6]

In Chemical Formula 6, $0.5 \leq x \leq 1.8$, $0 \leq a \leq 0.05$, $0 < y \leq 1$, $0 \leq z \leq 1$, $0 \leq y+z \leq 1$, $M^1$, $M^2$, and $M^3$ each independently include at least one element selected from a metal such as Ni, Co, Mn, Al, B, Ba, Ca, Ce, Cr, Fe, Mo, Nb, Si, Sr, Mg, Ti, V, W, Zr, or La, and a combination thereof, and X include at least one element selected from F, S, P, or Cl.

In Chemical Formula 6, $0.8 \leq y \leq 1$, $0 \leq z \leq 0.2$, and $M^1$ may be Ni.

The negative electrode active material may be graphite or may include a Si composite and graphite together.

The Si composite may include a core including Si-based particles and an amorphous carbon coating layer.

The Si-based particle may include one or more of a Si—C composite, $SiO_x$ ($0 < x \leq 2$), and a Si alloy.

The Si—C composite may include a core including Si particles and crystalline carbon and an amorphous carbon coating layer on the surface of the core, and an average particle diameter of the Si particles may be 50 nm to 200 nm.

Advantageous Effects

By applying an additive with improved high-temperature safety, it is possible to implement a rechargeable lithium battery having improved safety under adiabatic overcharge and high-rate overcharge conditions.

DESCRIPTION OF SYMBOLS

100: rechargeable lithium battery

112: negative electrode

113: separator

114: positive electrode

Figure 1:
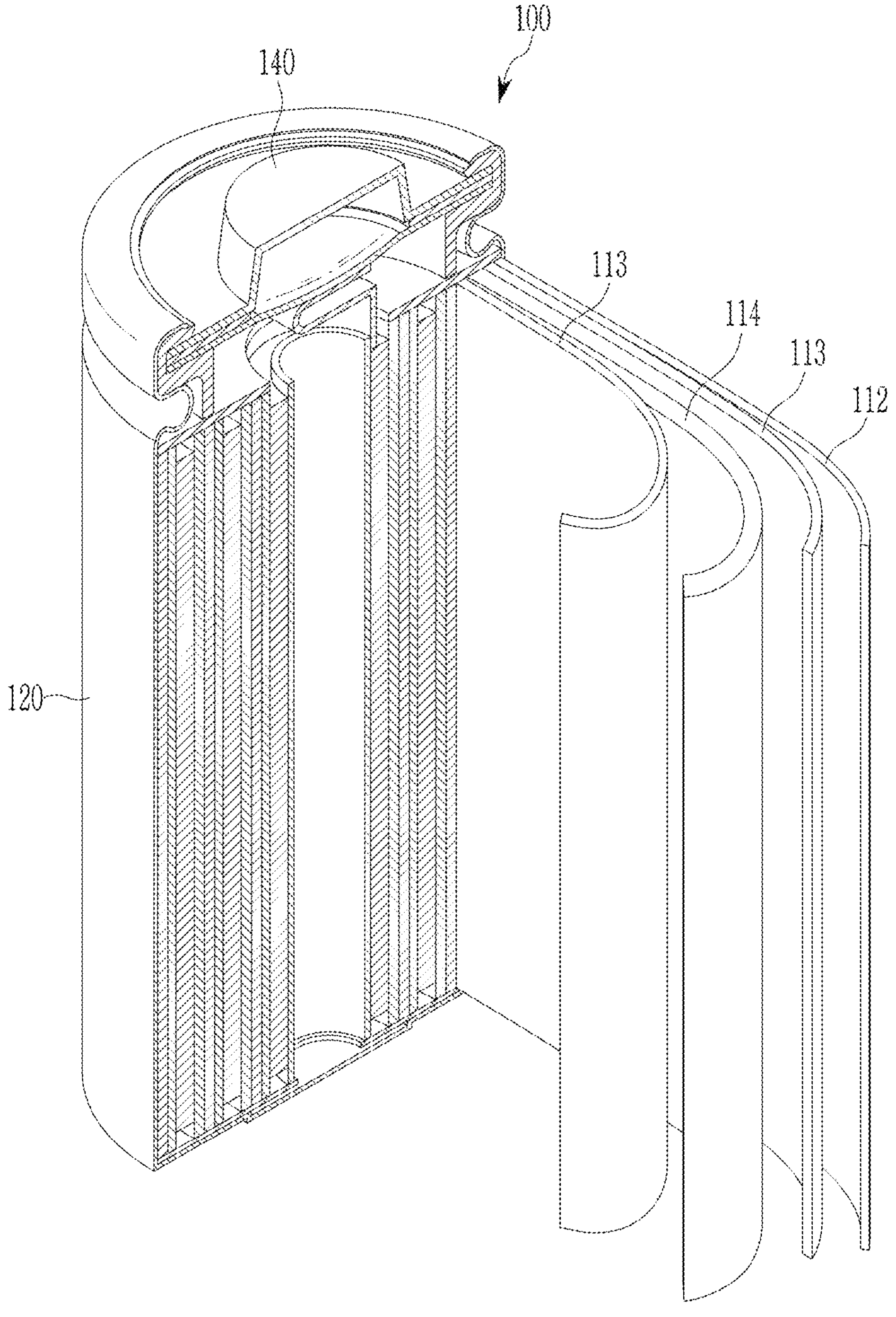
FIG. 1 is a schematic view showing a rechargeable lithium battery according to an embodiment of the present invention.

120: battery case
140: sealing member

MODE FOR INVENTION

Hereinafter, a rechargeable lithium battery according to an embodiment of the present invention will be described in detail with reference to the accompanying drawings. However, these embodiments are exemplary, the present invention is not limited thereto and the present invention is defined by the scope of claims.

In the present specification, unless otherwise defined, "substituted" means that at least one hydrogen in a substituent or compound is deuterium, a halogen group, a hydroxyl group, an amino group, a substituted or unsubstituted C1 to C30 amine group, a nitro group, a substituted or unsubstituted C1 to C40 silyl group, a C1 to C30 alkyl group, a C1 to C10 alkylsilyl group, a C6 to C30 arylsilyl group, a C3 to C30 cycloalkyl group, a C3 to C30 heterocycloalkyl group, a C6 to C30 aryl group, a C2 to C30 heteroaryl group, a C1 to C20 alkoxy group, a C1 to C10 fluoroalkyl group, a cyano group, or a combination thereof.

In one example of the present invention, "substituted" refers to replacement of at least one hydrogen in a substituent or compound by deuterium, a halogen group, a C1 to C30 alkyl group, a C1 to C10 alkylsilyl group, a C6 to C30 arylsilyl group, a C3 to C30 cycloalkyl group, a C3 to C30 heterocycloalkyl group, a C6 to C30 aryl group, a C2 to C30 heteroaryl group, a C1 to C10 fluoroalkyl group, or a cyano group. In one example of the present invention, "substituted" refers to replacement of at least one hydrogen of a substituent or a compound by deuterium, a halogen, a C1 to C30 alkyl group, a C1 to C10 alkylsilyl group, a C6 to C30 arylsilyl group, a C3 to C30 cycloalkyl group, a C3 to C30 heterocycloalkyl group, a C6 to C30 aryl group, a C2 to C30 heteroaryl group, a C1 to C10 fluoroalkyl group, or a cyano group. In addition, in specific examples of the present invention, "substituted" refers to replacement of at least one hydrogen of a substituent or a compound by deuterium, a halogen, a C1 to C5 alkyl group, a C6 to C18 aryl group, a C1 to C5 fluoroalkyl group, or a cyano group. In addition, in specific examples of the present invention, "substituted" refers to replacement of at least one hydrogen of a substituent or a compound by deuterium, a cyano group, a halogen, a methyl group, an ethyl group, a propyl group, a butyl group, a phenyl group, a biphenyl group, a terphenyl group, a trifluoromethyl group, or a naphthyl group.

In the present specification, unless otherwise defined, "hetero" refers to one including one to three heteroatoms selected from N, O, S, P, and Si, and remaining carbons in one functional group.

In the present specification, "aryl group" refers to a group including at least one hydrocarbon aromatic moiety, and all the elements of the hydrocarbon aromatic moiety have p-orbitals which form conjugation, for example a phenyl group, a naphthyl group, and the like, two or more hydrocarbon aromatic moieties may be linked by a sigma bond and may be, for example a biphenyl group, a terphenyl group, a quarterphenyl group, and the like, and two or more hydrocarbon aromatic moieties are fused directly or indirectly to provide a non-aromatic fused ring, for example a fluorenyl group.

The aryl group may include a monocyclic, polycyclic or fused ring polycyclic (i.e., rings sharing adjacent pairs of carbon atoms) functional group.

In the present specification, "heterocyclic group" is a generic concept of a heteroaryl group, and may include at least one heteroatom selected from N, O, S, P, and Si instead of carbon (C) in a cyclic compound such as aryl group, a cycloalkyl group, a fused ring thereof, or a combination thereof. When the heterocyclic group is a fused ring, the entire ring or each ring of the heterocyclic group may include one or more heteroatoms.

For example, "heteroaryl group" may refer to aryl group including at least one heteroatom selected from N, O, S, P, and Si. Two or more heteroaryl groups may be linked by a sigma bond directly, or when the heteroaryl group includes two or more rings, the two or more rings may be fused. When the heteroaryl group is a fused ring, each ring may include one to three heteroatoms.

More specifically, the substituted or unsubstituted C6 to C30 aryl group may be a substituted or unsubstituted phenyl group, a substituted or unsubstituted naphthyl group, a substituted or unsubstituted anthracenyl group, a substituted or unsubstituted phenanthrenyl group, a substituted or unsubstituted naphthacenyl group, a substituted or unsubstituted pyrenyl group, a substituted or unsubstituted biphenyl group, a substituted or unsubstituted p-terphenyl group, a substituted or unsubstituted m-terphenyl group, a substituted or unsubstituted o-terphenyl group, a substituted or unsubstituted chrysenyl group, a substituted or unsubstituted triphenylene group, a substituted or unsubstituted perylenyl group, a substituted or unsubstituted fluorenyl group, a substituted or unsubstituted indenyl group, a substituted or unsubstituted furanyl group, or a combination thereof, but is not limited thereto.

More specifically, the substituted or unsubstituted C2 to C30 heterocyclic group may be a substituted or unsubstituted thiophenyl group, a substituted or unsubstituted pyrrolyl group, a substituted or unsubstituted pyrazolyl group, a substituted or unsubstituted imidazolyl group, a substituted or unsubstituted triazolyl group, a substituted or unsubstituted oxazolyl group, a substituted or unsubstituted thiazolyl group, a substituted or unsubstituted oxadiazolyl group, a substituted or unsubstituted thiadiazolyl group, a substituted or unsubstituted pyridyl group, a substituted or unsubstituted pyrimidinyl group, a substituted or unsubstituted pyrazinyl group, a substituted or unsubstituted triazinyl group, a substituted or unsubstituted benzofuranyl group, a substituted or unsubstituted benzothiophenyl group, a substituted or unsubstituted benzimidazolyl group, a substituted or unsubstituted indolyl group, a substituted or unsubstituted quinolinyl group, a substituted or unsubstituted isoquinolinyl group, a substituted or unsubstituted quinazolinyl group, a substituted or unsubstituted quinoxalinyl group, a substituted or unsubstituted naphthyridinyl group, a substituted or unsubstituted benzoxazinyl group, a substituted or unsubstituted benzthiazinyl group, a substituted or unsubstituted acridinyl group, a substituted or unsubstituted phenazinyl group, a substituted or unsubstituted phenothiazinyl group, a substituted or unsubstituted phenoxazinyl group, a substituted or unsubstituted carbazolyl group, a substituted or unsubstituted dibenzofuranyl group, a substituted or unsubstituted dibenzothiophenyl group, or a combination thereof, but is not limited thereto.

A rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Herein, as an example of a rechargeable lithium battery, a cylindrical rechargeable lithium battery is for example described. FIG. 1 schematically illustrates the structure of a rechargeable lithium battery according to an embodiment. Referring to FIG. 1, a rechargeable lithium battery 100 according to an embodiment includes a battery cell including a positive electrode 114, a negative electrode 112 facing the positive electrode 114, a separator 113 between the positive electrode 114 and the negative electrode 112, and an electrolyte (not shown) impregnating the positive electrode 114, negative electrode 112, and separator 113, a battery case 120 housing the battery cell, and a sealing member 140 sealing the battery case 120.

Hereinafter, a more detailed configuration of the rechargeable lithium battery 100 according to an embodiment of the present invention will be described.

A rechargeable lithium battery according to an embodiment of the present invention includes an electrolyte, a positive electrode, and a negative electrode.

The electrolyte includes a non-aqueous organic solvent, a lithium salt, and an additive, wherein the additive is a composition including a first compound and a second compound, the first compound is a cesium salt compound, and the second compound is represented by Chemical Formula 1.

[Chemical Formula 1]

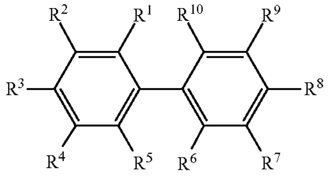

In Chemical Formula 1, $R^1$ to $R^{10}$ are each independently hydrogen, a halogen, a cyano group, a nitro group, an isocyanate group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C3 to C20 cycloalkenyl group, a substituted or unsubstituted C3 to C20 cycloalkynyl group, a substituted or unsubstituted C6 to C30 aryl group, a substituted or unsubstituted C2 to C30 heterocyclic group, a sulfate group ($—OSO_3R^a$), a sulfite group ($—OSO_2R^b$), a sulfonate group ($—SO_3R^c$), a sulfide group ($—SR^d$), an amine group ($—NR^eR^f$), an amide group ($—C(O)NR^gR^h$), or an acyl group ($—C(O)R^i$), wherein, $R^a$, $R^b$, $R^c$, $R^d$, $R^e$, $R^f$, $R^g$, $R^h$, and $R^i$ are each independently hydrogen, or a substituted or unsubstituted C1 to C10 alkyl group.

The second compound is a biphenyl-based compound and may suppress a resistance increase in the positive electrode and thus contribute to excellent overcharge safety.

Particularly, when combined with the first compound, which is a cesium salt compound, the second compound may be earlier reduced and decomposed than a carbonate-based solvent included in the non-aqueous organic solvent and may form an SEI (Solid Electrolyte Interphase) film on the negative electrode and thus prevent a decomposition reaction of the electrode, suppressing an increase in internal resistance due to gas generation and thereby, having an effect of suppressing additional exothermicity.

In other words, the first compound and the second compound are included together, improving the overcharge safety and suppressing the additional exothermicity and resultantly, realizing a rechargeable lithium battery with improved high-temperature safety even under a harsh condition such as an adiabatic condition, a high-rate charging condition, and the like.

For example, the anion of the cesium salt compound may be an imide-based anion or a phosphate-based anion.

As a specific example, the cesium salt compound may be represented by Chemical Formula 2 or Chemical Formula 3.

[Chemical Formula 2]

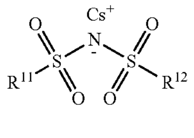

[Chemical Formula 3]

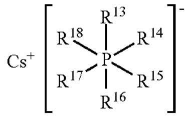

In Chemical Formula 2 and Chemical Formula 3, $R^{11}$ to $R^{18}$ are each independently a fluoro group or a C1 to C4 fluoroalkyl group substituted with at least one fluoro group.

For example, $R^{11}$ to $R^{18}$ in Chemical Formulas 2 and 3 may each independently be a fluoro group or a C1 to C4 fluoroalkyl group substituted with at least two fluoro groups.

For example, $R^{11}$ to $R^{18}$ in Chemical Formulas 2 and 3 may each independently be a fluoro group or a C1 to C4 fluoroalkyl group substituted with at least three fluoro groups.

As a specific example, $R^{11}$ to $R^{18}$ in Chemical Formulas 2 and 3 may each independently be a fluoro group or a C1 to C3 fluoroalkyl group substituted with at least three fluoro groups.

As a more specific example, $R^{11}$ to $R^{18}$ in Chemical Formulas 2 and 3 may each independently be a fluoro group or a C1 to C2 fluoroalkyl group substituted with at least three fluoro groups.

For example, Chemical Formula 2 may be represented by Chemical Formula 2-1 or Chemical Formula 2-2.

[Chemical Formula 2-1]

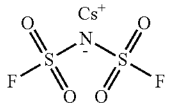

[Chemical Formula 2-2]

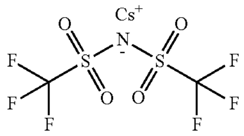

For example, Chemical Formula 3 may be represented by Chemical Formula 3-1.

[Chemical Formula 3-1]

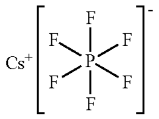

For example, the first compound may be included in an amount of 0.05 to 5.0 parts by weight, for example, 0.05 to 4.0 parts by weight, 0.05 to 3.0 parts by weight, 0.1 to 3.0 parts by weight, or 0.1 to 2.0 parts by weight based on 100 parts by weight of the electrolyte for the rechargeable lithium battery.

For example, in Chemical Formula 1, $R^1$ to $R^{10}$ are may each independently be hydrogen, a halogen, a cyano group, a nitro group, an isocyanate group, a substituted or unsubstituted C1 to C20 alkyl group, a substituted or unsubstituted C3 to C20 cycloalkyl group, a substituted or unsubstituted C6 to C30 aryl group, a sulfate group ($—OSO_3R^a$), a sulfite group ($—OSO_2R^b$), a sulfonate group ($—SO_3R^c$), a sulfide group ($—SR^d$), an amine group ($—NR^eR^f$), an amide group ($—C(O)NR^gR^h$), or an acyl group ($—C(O)R^i$), wherein, $R^a$, $R^b$, $R^c$, $R^d$, $R^e$, $R^f$, $R^g$, $R^h$, and $R^i$ may each independently be hydrogen, or a substituted or unsubstituted C1 to C10 alkyl group.

As a specific example, in Chemical Formula 1, $R^1$ to $R^{10}$ may each independently be hydrogen, fluoro, a cyano group, a nitro group, an isocyanate group, a substituted or unsubstituted C1 to C10 alkyl group, a substituted or unsubstituted C6 to C12 aryl group, a sulfate group ($—OSO_3R^a$), a sulfite group ($—OSO_2R^b$), a sulfonate group ($—SO_3R^c$), a sulfide group ($—SR^d$), an amine group ($—NR^eR^f$), an amide group ($—C(O)NR^gR^h$), or an acyl group ($—C(O)R^i$), wherein, $R^a$, $R^b$, $R^c$, $R^d$, $R^e$, $R^f$, $R^g$, $R^h$, and $R^i$ may each independently be hydrogen, or a substituted or unsubstituted C1 to C5 alkyl group.

For example, in Chemical Formula 1, $R^1$ to $R^{10}$ may each independently be hydrogen, fluoro, a cyano group, a nitro group, an isocyanate group, a methyl group, an ethyl group, a propyl group, an isopropyl group, a butyl group, a tert-butyl group, a trifluoromethyl group, a tetrafluoroethyl group, a substituted or unsubstituted phenyl group, a substituted or unsubstituted naphthyl group, a sulfate group ($—OSO_3R^a$), a sulfite group ($—OSO_2R^b$), a sulfonate group ($—SO_3R^c$), a sulfide group ($—SR^d$), an amine group ($—NR^eR^f$), an amide group ($—C(O)NR^gR^h$), or an acyl group ($—C(O)R^i$), wherein, $R^a$, $R^b$, $R^c$, $R^d$, $R^e$, $R^f$, $R^g$, $R^h$, and $R^i$ may each independently be hydrogen, a methyl group, an ethyl group, a propyl group, an isopropyl group, a butyl group, a tert-butyl group, a trifluoromethyl group, or a tetrafluoroethyl group.

The most specific examples of the second compound include biphenyl, 2-fluoro biphenyl, and the like, but are not limited thereto.

For example, the second compound may be included in an amount of 0.1 to 10.0 parts by weight, for example, 0.1 to 8.0 parts by weight, 0.1 to 6.0 parts by weight, or 0.2 to 5.0 parts by weight based on 100 parts by weight of the electrolyte for the rechargeable lithium battery.

For example, the composition may include the first compound and the second compound in a weight ratio of 1:0.1 to 1:30.

Specifically, the composition may include the first compound and the second compound in a weight ratio of 1:0.2 to 1:30, 1:0.3 to 1:30, 1:0.3 to 1:25, 1:0.3 to 1:20, or 1:0.4 to 1:20.

In an embodiment, the composition may include the first compound and the second compound in a weight ratio of 1:0.4, 1:1, 1:2, 1:4, 1:10 or 1:20.

When the mixing ratio of the first compound and the second compound is as described above, the degree of improvement in overcharge safety may be maximized.

The composition may be included in an amount of 0.5 to 10.0 parts by weight, for example, 0.5 to 8.0 parts by weight, 0.5 to 6.0 parts by weight, or 0.6 to 5.5 parts by weight, based on 100 parts by weight of the electrolyte for the rechargeable lithium battery.

When the content of the composition and the content of each component in the composition are within the above ranges, a rechargeable lithium battery with improved high-temperature safety may be implemented.

The non-aqueous organic solvent serves as a medium for transmitting ions taking part in the electrochemical reaction of a battery.

The non-aqueous organic solvent serves as a medium for transmitting ions taking part in the electrochemical reaction of a battery.

The carbonate-based solvent may be dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. The ester-based solvent may be methyl acetate, ethyl acetate, n-propyl acetate, t-butyl acetate, methyl propionate, ethyl propionate, propyl propionate, decanolide, mevalonolactone, caprolactone, and the like. The ether-based solvent may be dibutyl ether, tetraglyme, diglyme, dimethoxyethane, 2-methyltetrahydrofuran, tetrahydrofuran, and the like. In addition, the ketone-based solvent may be cyclohexanone, and the like. The alcohol-based solvent may include ethanol, isopropyl alcohol, and the like, and the aprotic solvent may include nitriles such as $R^{18}$—CN (wherein $R^{18}$ is a hydrocarbon group having a C2 to C20 linear, branched, or cyclic structure and may include a double bond, an aromatic ring, or an ether bond), and the like, amides such as dimethyl formamide, and the like, dioxolanes such as 1,3-dioxolane, and the like, sulfolanes, and the like.

The non-aqueous organic solvent may be used alone or in a mixture, and when used in a mixture, the mixing ratio may be appropriately adjusted in accordance with a desired battery performance, which is widely understood by those skilled in the art.

The carbonate-based solvent is prepared by mixing a cyclic carbonate and a chain carbonate. When the cyclic carbonate and chain carbonate are mixed together in a volume ratio of 1:9 to 9:1, a performance of the electrolyte may be improved.

In particular, in an embodiment, the non-aqueous organic solvent may include the cyclic carbonate and the chain carbonate in a volume ratio of 2:8 to 5:5, and as a specific example, the cyclic carbonate and the chain carbonate may be included in a volume ratio of 2:8 to 4:6.

More specifically, the cyclic carbonate and the chain carbonate may be included in a volume ratio of 2:8 to 3:7.

The non-aqueous organic solvent may further include an aromatic hydrocarbon-based organic solvent in addition to the carbonate-based solvent.

Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 4.

[Chemical Formula 4]

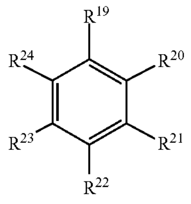

In Chemical Formula 4, $R^{19}$ to $R^{24}$ are the same or different and are hydrogen, a halogen, a C1 to C10 alkyl group, a haloalkyl group, or a combination thereof.

Specific examples of the aromatic hydrocarbon-based organic solvent may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may further include vinylene carbonate, vinyl ethylene carbonate, or an ethylene carbonate-based compound represented by Chemical Formula 5 as an additive to improve cycle-life of a battery.

[Chemical Formula 5]

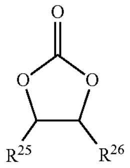

In Chemical Formula 5, $R^{25}$ and $R^{26}$ are the same or different, and are selected from hydrogen, a halogen, a cyano group (CN), a nitro group ($NO_2$), and a fluorinated C1 to C5 alkyl group, provided that at least one of $R^{25}$ and $R^{26}$ is selected from a halogen, a cyano group (CN), a nitro group ($NO_2$), and a fluorinated C1 to C5 alkyl group, and both $R^{25}$ and $R^{26}$ are not hydrogen.

Examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. When such an additive for improving cycle-life is further used, its amount may be appropriately adjusted.

The lithium salt dissolved in the non-organic solvent supplies lithium ions in a battery, enables a basic operation of a rechargeable lithium battery, and improves transportation of the lithium ions between positive and negative electrodes. Examples of the lithium salt may include at least one selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$ (wherein x and y are natural numbers, for example an integer of 1 to 20), LiCl, LiI, $LiB(C_2O_4)_2$ (lithium bis(oxalato) borate: LiBOB), LiDFOB (lithium difluoro(oxalato)borate), and $Li[PF_2(C_2O_4)_2]$ (lithium difluoro(bis oxalato)phosphate). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

The positive electrode includes a positive electrode current collector and a positive electrode active material layer on the positive electrode current collector, and the positive electrode active material layer includes a positive electrode active material.

The positive electrode active material may include lithiated intercalation compounds that reversibly intercalate and deintercalate lithium ions.

Specifically, at least one of a composite oxide of a metal selected from cobalt, manganese, nickel, and a combinations thereof and lithium may be used.

Of course, the composite oxide in which a portion of the metal is substituted with a metal other than another metal may be used, and a phosphate compound of the composite oxide, for example, at least one selected $LiFePO_4$, $LiCoPO_4$, and $LiMnPO_4$ may be used. The lithium composite oxide may have a coating layer on the surface, or the lithium composite oxide may be mixed with another composite oxide having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating process may include any conventional processes as long as it does not cause any side effects on the properties of the positive electrode active material (e.g., inkjet coating, dipping), which is well known to persons having ordinary skill in this art, so a detailed description thereof is omitted.

The positive electrode active material may be, for example, at least one of lithium composite oxides represented by Chemical Formula 6.

$$Li_xM^1_yM^2_zM^3_{1-y-z}O_{2-a}X_a$$ [Chemical Formula 6]

In Chemical Formula 6, $0.5 \le x \le 1.8$, $0 \le a \le 0.05$, $0 < y \le 1$, $0 \le z \le 1$, $0 \le y+z \le 1$, $M^1$, $M^2$, and $M^3$ each independently include at least one element selected from a metal such as Ni, Co, Mn, Al, B, Ba, Ca, Ce, Cr, Fe, Mo, Nb, Si, Sr, Mg, Ti, V, W, Zr, or La, and a combination thereof, and X include at least one element selected from F, S, P, and Cl.

In an embodiment, the positive electrode active material may be at least one selected from $LiCoO_2$, $LiNiO_2$, $LiMnO_2$, $LiMn_2O_4$, $LiNi_aMn_bCo_cO_2$ (a+b+c=1), $LiNi_aMn_bCo_cAl_dO_2$ (a+b+c+d=1), and $LiNi_eCo_fAl_gO_2$ (e+f+g=1).

In Chemical Formula 6, $0.8 \le y \le 1$, $0 \le z \le 0.2$, and $M^1$ may be Ni.

For example, the positive electrode active material selected from $LiNi_aMn_bCo_cO_2$ (a+b+c=1), $LiNi_aMn_bCo_cAl_dO_2$ (a+b+c+d=1), and $LiNi_eCo_fAl_gO_2$ (e+f+g=1) may be a high Ni-based positive electrode active material.

For example, in the case of $LiNi_aMn_bCo_cO_2$ (a+b+c=1) and $LiNi_aMn_bCo_cAl_dO_2$ (a+b+c+d=1), the nickel content may be greater than or equal to 60% (a≥0.6), and more specifically, greater than or equal to 80% (a≥0.8).

For example, in the case of $LiNi_eCo_fAl_gO_2$ (e+f+g=1), the nickel content may be greater than or equal to 60% (e≥0.6), and more specifically, greater than or equal to 80% (e≥0.8).

A content of the positive electrode active material may be 90 wt % to 98 wt % based on the total weight of the positive electrode active material layer.

In an embodiment of the present invention, the positive electrode active material layer may optionally include a conductive material and a binder. In this case, a content of the conductive material and the binder may be 1 wt % to 5 wt %, respectively, based on the total weight of the positive electrode active material layer.

The conductive material is included to impart conductivity to the positive electrode and any electrically conductive material may be used as a conductive material unless it causes a chemical change in the configured battery. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The binder improves binding properties of positive electrode active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The positive electrode current collector may include Al, but is not limited thereto.

The negative electrode includes a negative electrode current collector and a negative electrode active material layer including a negative electrode active material formed on the negative electrode current collector.

The negative electrode active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions includes carbon materials. The carbon material may be any generally-used carbon-based negative electrode active material in a rechargeable lithium battery and examples of the carbon material include crystalline carbon, amorphous carbon, and a combination thereof. The crystalline carbon may be non-shaped, or sheet, flake, spherical, or fiber shaped natural graphite or artificial graphite and the amorphous carbon may be a soft carbon, a hard carbon, a mesophase pitch carbonization product, calcined coke, and the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, Si—C composite, $SiO_x$ (0<x<2), a Si-Q alloy wherein Q is an element selected from an alkali metal, an alkaline-earth metal, a Group 13 element, a Group 14 element, a Group 15 element, a Group 16 element, a transition metal, a rare earth element, and a combination thereof, but not Si), Sn, $SnO_2$, a Sn—$R^{61}$ alloy (wherein $R^{61}$ is an element selected from an alkali metal, an alkaline-earth metal, a Group 13 element, a Group 14 element, a Group 15 element, a Group 16 element, a transition metal, a rare earth element, and a combination thereof, but not Sn), and the like. At least one of these materials may be mixed with $SiO_2$.

The elements Q and $R^{61}$ may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof.

The transition metal oxide may be a vanadium oxide, a lithium vanadium oxide, and the like.

In a specific embodiment, the negative electrode active material may be graphite or may include a Si composite and graphite together.

When the negative electrode active material includes the Si composite and graphite together, the Si composite and graphite may be included in the form of a mixture, and the Si composite and graphite may be included in a weight ratio of 1:99 to 50:50. More specifically, the Si composite and graphite may be included in a weight ratio of 3:97 to 20:80 or 5:95 to 20:80.

The Si composite may include a core including Si-based particles and an amorphous carbon coating layer. For example, the Si-based particles may include at least one of a Si—C composite, $SiO_x$ (0<x≤2), and a Si alloy. For example, the Si—C composite may include a core including Si particles and crystalline carbon, and an amorphous carbon coating layer on the surface of the core.

The crystalline carbon may include, for example, graphite, and more specifically, natural graphite, artificial graphite, or a mixture thereof.

An average particle diameter of the crystalline carbon may be 5 μm to 30 μm.

In the present specification, an average particle diameter may be a particle size (D50) at a volume ratio of 50% in a cumulative size-distribution curve.

In the Si—C composite, an average particle diameter of the Si particles may be 50 nm to 200 nm.

When the average particle diameter of the Si particles is within the above ranges, volume expansion occurring during charging and discharging may be suppressed, and interruption of a conductive path due to particle crushing during charging and discharging may be prevented.

The Si particles may be included in an amount of 1 wt % to 60 wt %, for example, 3 wt % to 60 wt %, based on the total weight of the Si—C composite.

The amorphous carbon may include soft carbon, hard carbon, a mesophase pitch carbonized product, calcined coke, or a mixture thereof.

The amorphous carbon may be included in an amount of 1 to 50 parts by weight, for example, 5 to 50 parts by weight, or 10 to 50 parts by weight based on 100 parts by weight of the crystalline carbon.

In the negative electrode active material layer, the negative electrode active material may be included in an amount of 95 wt % to 99 wt % based on the total weight of the negative electrode active material layer.

In an embodiment, the negative electrode active material layer may include a binder, and optionally a conductive material. The content of the binder in the negative electrode active material layer may be 1 wt % to 5 wt % based on the total weight of the negative electrode active material layer. In addition, when the conductive material is further included, 90 wt % to 98 wt % of the negative electrode active material, 1 wt % to 5 wt % of the binder, and 1 wt % to 5 wt % of the conductive material may be used.

The binder improves binding properties of negative electrode active material particles with one another and with a current collector. The binder may be a non-water-soluble binder, a water-soluble binder, or a combination thereof.

The non-water-soluble binder may be polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, ethylenepropyleneco polymer, polyethylene oxide, polyvinylpyrrolidone, polyepichlorohydrine, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. Such a thickener may be included in an amount of 0.1 parts by weight to 3 parts by weight based on 100 parts by weight of the negative electrode active material.

The conductive material is included to improve electrode conductivity and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The negative electrode current collector may be selected from a copper foil, a nickel foil, a stainless-steel foil, a titanium foil, a nickel foam, a copper foam, a polymer substrate coated with a conductive metal, and a combination thereof.

The rechargeable lithium battery may further include a separator between the negative electrode and the positive electrode, depending on a type of the battery. Such a separator may be a porous substrate or a composite porous substrate.

The porous substrate may be a substrate including pores, and lithium ions may move through the pores. The porous substrate may for example include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The composite porous substrate may have a form including a porous substrate and a functional layer on the porous substrate. The functional layer may be, for example, at least one of a heat-resistant layer and an adhesive layer from the viewpoint of enabling additional function. For example, the heat-resistant layer may include a heat-resistant resin and optionally a filler.

In addition, the adhesive layer may include an adhesive resin and optionally a filler.

The filler may be an organic filler or an inorganic filler.

DETAILED DESCRIPTION OF THE EMBODIMENTS

Hereinafter, examples of the present invention and comparative examples are described. These examples, however, are not in any sense to be interpreted as limiting the scope of the invention.

Manufacture of Rechargeable Lithium Battery Cells

Comparative Example 1

$LiNi_{0.88}Co_{0.07}Al_{0.05}O_2$ as a positive electrode active material, polyvinylidene fluoride as a binder, and ketjen black as a conductive material were mixed in a weight ratio of 97:2:1 and then, dispersed in N-methyl pyrrolidone, preparing positive electrode active material slurry.

The positive electrode active material slurry was coated on a 14 μm-thick Al foil, dried at 110° C., and pressed, manufacturing a positive electrode.

A negative electrode active material prepared by mixing artificial graphite and an Si—C composite in a weight ratio of 93:7, a styrene-butadiene rubber binder as a binder, and carboxylmethyl cellulose as a thickener were mixed in a weight ratio of 97:1:2 and then, dispersed in distilled water, preparing negative electrode active material slurry.

The Si—C composite included a core including artificial graphite and silicon particles and coal-based pitch coated on the surface of the core.

The negative electrode active material slurry was coated on a 10 μm-thick Cu and then, dried at 100° C. and pressed, manufacturing a negative electrode.

The positive electrode and the negative electrode were assembled with a 25 μm-thick polyethylene separator to manufacture an electrode assembly, and an electrolyte was injected thereinto, manufacturing a rechargeable lithium battery cell.

The electrolyte had a composition as follows.

(Composition of the Electrolyte)

Salt: 1.5 M $LiPF_6$

Solvent: ethylene carbonate: ethylmethyl carbonate: dimethyl carbonate (EC: EMC:DMC=a volume ratio of 20:10:70)

Comparative Example 2

A rechargeable lithium battery cell was manufactured in the same manner as in Comparative Example 1, except that 0.5 part by weight of cesium hexafluorophosphate was added to the electrolyte.

(However, in the composition of the electrolyte, "parts by weight" means a relative weight of additives based on 100 weight of the total electrolyte (lithium salt+non-aqueous organic solvent).)

Comparative Example 3

A rechargeable lithium battery cell was manufactured in the same manner as in Comparative Example 1, except that 2.0 parts by weight of biphenyl was added to the electrolyte.

Comparative Example 4

A rechargeable lithium battery cell was manufactured in the same manner as in Comparative Example 1, except that 2.0 parts by weight of 2-fluoro biphenyl was added to the electrolyte.

Comparative Example 5

A rechargeable lithium battery cell was manufactured in the same manner as in Comparative Example 1, except that 2.0 parts by weight of 4-fluorophenyl isocyanate was added to the electrolyte.

Comparative Example 6

A rechargeable lithium battery cell was manufactured in the same manner as in Comparative Example 1, except that 2.0 parts by weight of 2,2'-(1,4-phenylene)dimalononitrile was added to the electrolyte.

Comparative Example 7

A rechargeable lithium battery cell was manufactured in the same manner as in Comparative Example 1, except that a composition including 0.5 parts by weight of cesium hexafluorophosphate and 2.0 parts by weight of 4-fluorophenyl isocyanate was added to the electrolyte.

Comparative Example 8

A rechargeable lithium battery cell was manufactured in the same manner as in Comparative Example 1, except that a composition including 0.5 parts by weight of cesium hexafluorophosphate and 2.0 parts by weight of 2,2'-(1,4-phenylene)dimalononitrile was added to the electrolyte.

Comparative Examples 9 and 10

Rechargeable lithium battery cells were manufactured in the same manner as in Comparative Example 2, except that cesium hexafluorophosphate was changed into cesium bis(fluorosulfonyl)imide (Comparative Example 9) or cesium bis(trifluoromethanesulfonyl)imide (Comparative Example 10).

Comparative Examples 11 to 14

Rechargeable lithium battery cells were manufactured in the same manner as in Comparative Examples 7 and 8, except that cesium hexafluorophosphate was changed into cesium bis(fluorosulfonyl)imide (Comparative Examples 11 and 12) or cesium bis(trifluoromethanesulfonyl)imide (Comparative Examples 13 and 14), respectively.

Example 1

A rechargeable lithium battery cell was manufactured in the same manner as in Comparative Example 1, except that a composition including 0.5 parts by weight of cesium hexafluorophosphate and 2.0 parts by weight of biphenyl was added to the electrolyte.

Example 2

A rechargeable lithium battery cell was manufactured in the same manner as in Comparative Example 1, except that a composition including 0.5 parts by weight of cesium hexafluorophosphate and 2.0 parts by weight of 2-fluorobiphenyl was added to the electrolyte.

Examples 3 to 10

Rechargeable lithium battery cells were manufactured by changing compositions of the cesium hexafluorophosphate and biphenyl or 2-fluoro biphenyl as shown in Table 1.

Compositions according to Examples and Comparative Examples are shown in Table 1.

Examples 11 to 30

Rechargeable lithium battery cells were manufactured in the same manner as in Examples 1 to 10, except that cesium hexafluorophosphate was changed in to cesium bis(fluorosulfonyl)imide (Examples 11 to 20) or cesium bis(trifluoromethanesulfonyl)imide (Examples 21 to 30), respectively.

Evaluation: Overcharge Evaluation

An overcharge evaluation was performed with respect to the battery cells according to Examples 1 to 30 and Comparative Examples 1 to 14.

The overcharge evaluation was performed under adiabatic conditions and high-rate charging conditions, respectively, and specific evaluation methods are as follows.

Overcharge Evaluation Under Adiabatic Condition

The overcharge evaluation was performed by attaching tabs to negative and positive electrode portions of each cell through welding and also attaching a thermocouple for measuring a temperature to the center of the cell. After wrapping the cell with an insulating material, charge/discharger positive and negative terminals were respectively connected to each positive and negative electrode tab. The cell was measured with respect to changes in voltage and temperature by applying a predetermined current (0.5 C) thereto under a condition of reaching 10 V when CID (Current Interrupt Device) was open.

Figure 2:
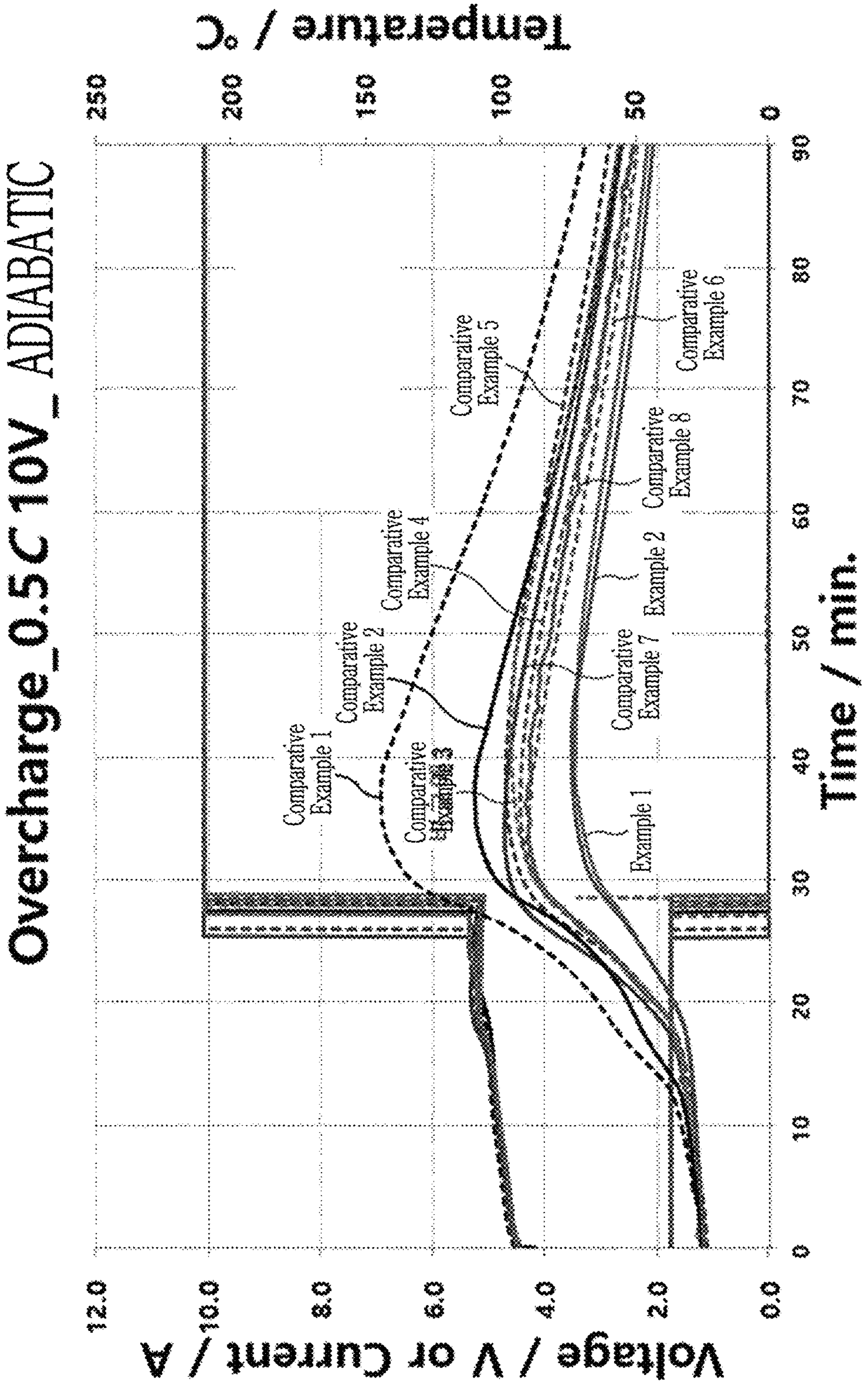
FIG. 2 is an overcharge evaluation graph of rechargeable lithium battery cells according to Examples 1 and 2 and Comparative Examples 1 to 8 under adiabatic conditions.
Figure 3:
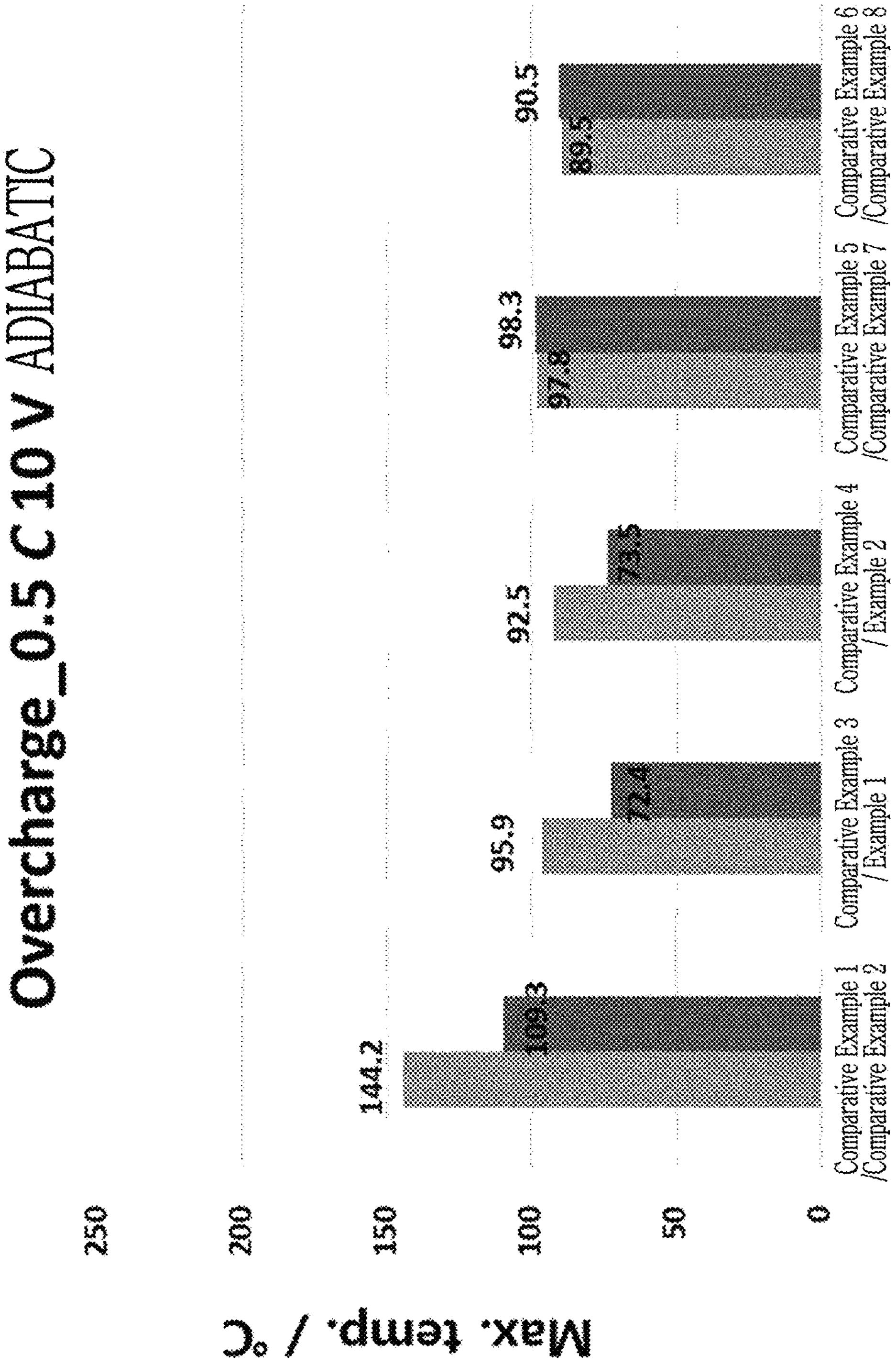
FIG. 3 is a graph showing changes in the maximum exothermic temperature of the rechargeable lithium battery cells according to Examples 1 and 2 and Comparative Examples 1 to 8 in overcharge evaluation conducted under adiabatic conditions.

The voltage and temperature change profile of the cell is shown in FIG. 2, and a maximum exothermic temperature and a temperature change of the cell are shown in FIG. 3 and Table 1.

FIG. 2 is an overcharge evaluation graph of the rechargeable lithium battery cells according to Examples 1 and 2 and Comparative Examples 1 to 8 under adiabatic conditions.

FIG. 3 is a graph showing changes in the maximum exothermic temperature of the rechargeable lithium battery cells according to Examples 1 and 2 and Comparative Examples 1 to 8 in the overcharge evaluation conducted under adiabatic conditions.

Referring to FIGS. 2 and 3, when the composition according to an example embodiment of the present invention was included as an additive, an internal short circuit was delayed under the adiabatic conditions (FIG. 2), and the maximum exothermic temperature became relatively lower (FIG. 3), having an excellent effect of suppressing thermal runaway due to the short circuit and mitigating the internal short circuit.

Evaluation of Overcharge Under High-Rate Charging Condition

The overcharge evaluation was performed by attaching tabs to negative and positive electrode portions of each cell through welding and also, attaching a thermocouple for measuring a temperature in the center of the cell. And, charge/discharger positive and negative terminals were respectively connected to the positive and negative electrodes. The cell was measured with respect to changes in a voltage and a temperature by applying a high-rate current (3 C) thereto under a condition of reaching 10 V when CID (Current Interrupt Device) was open.

Figure 4:
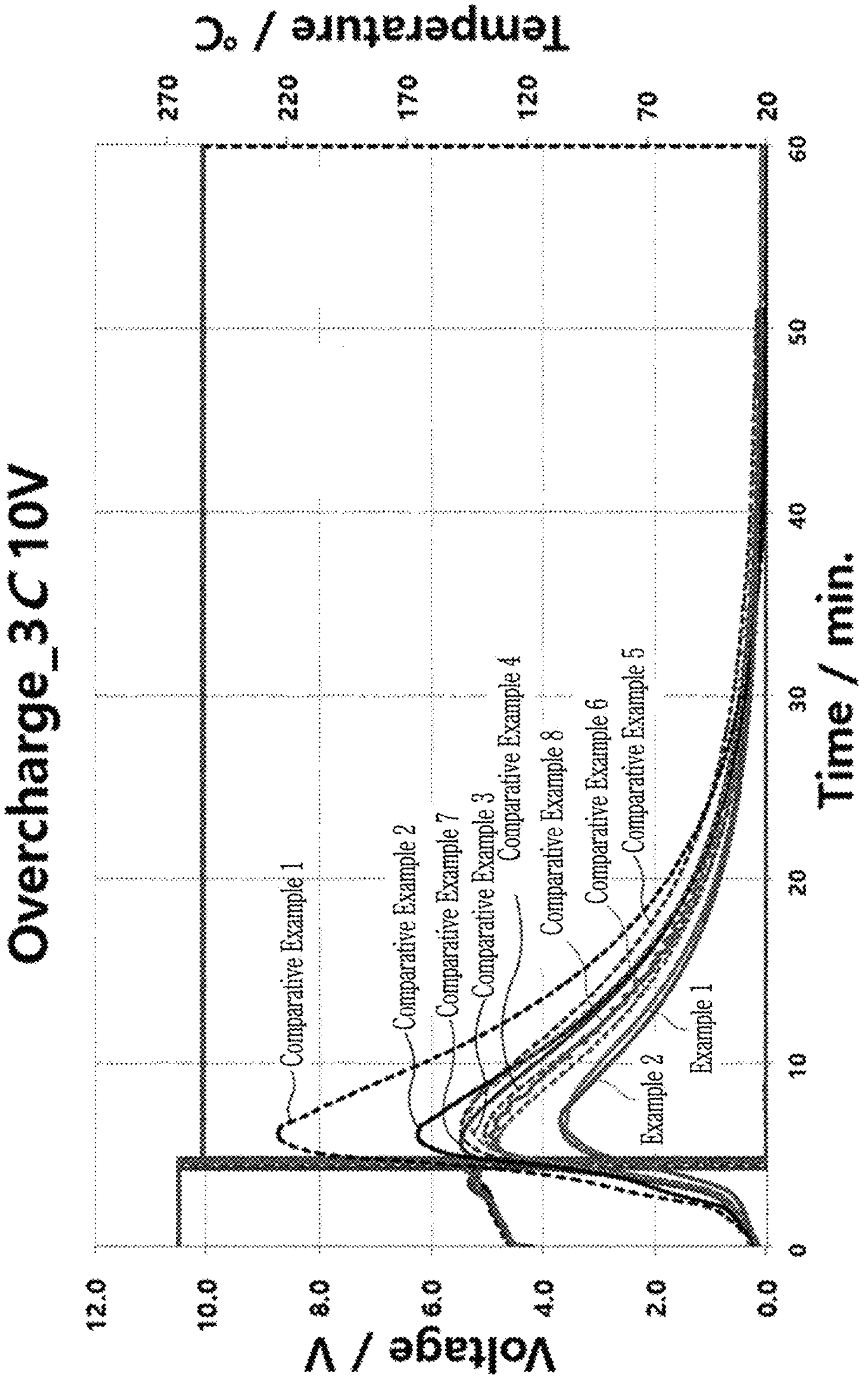
FIG. 4 is an overcharge evaluation graph of the rechargeable lithium battery cells according to Examples 1 and 2 and Comparative Examples 1 to 8 under high-rate charging conditions.
Figure 5:
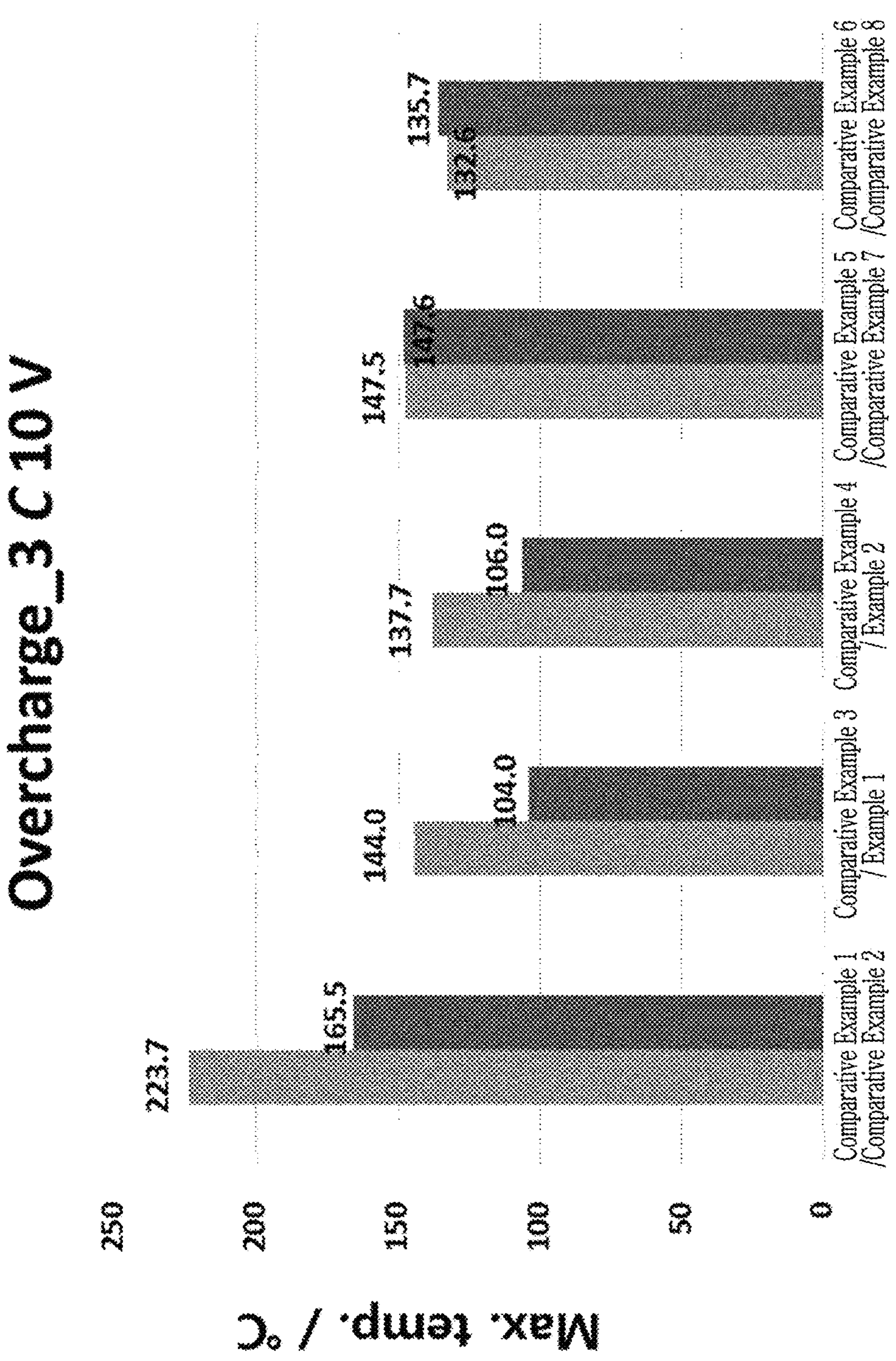
FIG. 5 is a graph showing changes in the maximum exothermic temperature of the rechargeable lithium battery cells according to Examples 1 and 2 and Comparative Examples 1 to 8 in overcharge evaluation conducted under high-rate charging conditions.

The voltage and temperature change profile of the cell is shown in FIG. 4, and a maximum exothermic temperature and a temperature change of the cell are shown in FIG. 5 and Table 1.

FIG. 4 is an overcharge evaluation graph of the rechargeable lithium battery cells according to Examples 1 and 2 and Comparative Examples 1 to 8 under high-rate charging conditions.

FIG. 5 is a graph showing changes in the maximum exothermic temperature of the rechargeable lithium battery cells according to Examples 1 and 2 and Comparative Examples 1 to 8 in overcharge evaluation conducted under high-rate charging conditions.

Referring to FIGS. 4 and 5, when the composition according to an example embodiment of the present invention was included as an additive, an internal short circuit was delayed under adiabatic conditions (FIG. 4), and the maximum exothermic temperature became relatively lower (FIG. 5), bringing about an excellent effect of suppressing thermal runaway due to the short circuit and mitigating the internal short circuit.

TABLE 1

| | Additive composition | | Maximum exothermic temperature (° C.) | |
|---|---|---|---|---|
| | First compound (parts by weight) | Second compound (parts by weight) | Adiabatic condition | High-rate condition |
| Comparative Example 1 | — | — | 144.2 | 223.7 |
| Comparative Example 2 | $CsPF_6$ (0.5) | — | 109.3 | 165.5 |
| Comparative Example 3 | — | BP (2.0) | 95.9 | 144.0 |
| Comparative Example 4 | — | 2-FBP (2.0) | 92.5 | 137.7 |
| Comparative Example 5 | — | 4-FPI (2.0) | 97.8 | 147.5 |
| Comparative Example 6 | — | PMN (2.0) | 89.5 | 132.6 |
| Comparative Example 7 | $CsPF_6$ (0.5) | 4-FPI (2.0) | 98.3 | 147.6 |
| Comparative Example 8 | $CsPF_6$ (0.5) | PMN (2.0) | 90.5 | 135.7 |
| Comparative Example 9 | CsFSI (0.5) | — | 128.3 | 182.1 |
| Comparative Example 10 | CsTFSI (0.5) | — | 112.8 | 168.6 |
| Comparative Example 11 | CsFSI (0.5) | 4-FPI (2.0) | 96.7 | 145.8 |
| Comparative Example 12 | CsFSI (0.5) | PMN (2.0) | 91.2 | 133.4 |
| Comparative Example 13 | CsTFSI (0.5) | 4-FPI (2.0) | 95.7 | 146.6 |
| Comparative Example 14 | CsTFSI (0.5) | PMN (2.0) | 93.8 | 134.8 |

TABLE 1-continued

| | Additive composition | | Maximum exothermic temperature (° C.) | |
|---|---|---|---|---|
| | First compound (parts by weight) | Second compound (parts by weight) | Adiabatic condition | High-rate condition |
| Example 1 | $CsPF_6$ (0.5) | BP (2.0) | 72.4 | 104.0 |
| Example 2 | $CsPF_6$ (0.5) | 2-FBP (2.0) | 73.5 | 106.0 |
| Example 3 | $CsPF_6$ (0.1) | BP (2.0) | 75.6 | 106.8 |
| Example 4 | $CsPF_6$ (0.1) | 2-FBP (2.0) | 76.2 | 107.9 |
| Example 5 | $CsPF_6$ (2.0) | BP (2.0) | 75.4 | 105.9 |
| Example 6 | $CsPF_6$ (2.0) | 2-FBP (2.0) | 76.0 | 106.5 |
| Example 7 | $CsPF_6$ (0.5) | BP (0.2) | 74.8 | 106.2 |
| Example 8 | $CsPF_6$ (0.5) | 2-FBP (0.2) | 76.3 | 107.7 |
| Example 9 | $CsPF_6$ (0.5) | BP (5.0) | 75.1 | 105.9 |
| Example 10 | $CsPF_6$ (0.5) | 2-FBP (5.0) | 74.9 | 107.3 |
| Example 11 | CsFSI (0.5) | BP (2.0) | 72.1 | 108.1 |
| Example 12 | CsFSI (0.5) | 2-FBP (2.0) | 73.4 | 107.8 |
| Example 13 | CsFSI (0.1) | BP (2.0) | 76.3 | 100.3 |
| Example 14 | CsFSI (0.1) | 2-FBP (2.0) | 77.1 | 106.3 |
| Example 15 | CsFSI (2.0) | BP (2.0) | 75.4 | 105.1 |
| Example 16 | CsFSI (2.0) | 2-FBP (2.0) | 73.6 | 100.3 |
| Example 17 | CsFSI (0.5) | BP (0.2) | 72.6 | 109.0 |
| Example 18 | CsFSI (0.5) | 2-FBP (0.2) | 71.6 | 104.1 |
| Example 19 | CsFSI (0.5) | BP (5.0) | 73.4 | 104.8 |
| Example 20 | CsFSI (0.5) | 2-FBP (5.0) | 74.2 | 104.3 |
| Example 21 | CsTFSI (0.5) | BP (2.0) | 73.8 | 103.8 |
| Example 22 | CsTFSI (0.5) | 2-FBP (2.0) | 72.1 | 102.9 |
| Example 23 | CsTFSI (0.1) | BP (2.0) | 75.5 | 106.7 |
| Example 24 | CsTFSI (0.1) | 2-FBP (2.0) | 75.9 | 105.3 |
| Example 25 | CsTFSI (2.0) | BP (2.0) | 74.3 | 104.9 |
| Example 26 | CsTFSI (2.0) | 2-FBP (2.0) | 72.1 | 105.1 |
| Example 27 | CsTFSI (0.5) | BP (0.2) | 70.3 | 107.8 |
| Example 28 | CsTFSI (0.5) | 2-FBP (0.2) | 71.9 | 106.3 |
| Example 29 | CsTFSI (0.5) | BP (5.0) | 74.3 | 106.2 |
| Example 30 | CsTFSI (0.5) | 2-FBP (5.0) | 73.8 | 103.1 |

$CsPF_6$: cesium hexafluorophosphate (Chemical Formula 3-1)
CsFSI: cesium bis(fluorosulfonyl)imide (Chemical Formula 2-1)
CsTFSI: cesium bis(trifluoromethanesulfonyl)imide (Chemical Formula 2-2)
BP: Bipehnyl
2-FBP: 2-Fluoro biphenyl
4-FPI: 4-Fluorophenyl isocyanate
PMN: 2,2'-(1,4-phenylene)dimalononitrile In general, when a cylindrical battery cell reaches an overcharge state, as a positive electrode lattice structure is primarily collapsed, transition metals are eluted therefrom to an electrolyte, generating oxygen gas. This positive electrode structure collapse causes a primary exothermic reaction. The transition metals eluted from the positive electrode are deposited on the negative electrode in the form of metal dendrites, breaking through a separator and causing an internal short circuit. As a result, the short circuit causes thermal runaway, which combusts an electrolyte and thus sharply increases an exothermic reaction, and gas generated due to the electrolyte combustion increases an internal pressure of the cell, making CID open.

A cesium-based salt forms SEI having large $Cs^+$ cations on the negative electrode surface. The large $Cs^+$ cations formed on the film (SEI) of the negative electrode suppress the transition metals electrodeposited on the negative electrode from growing into dendrites during the overcharge and lead the transition metals to be deposited in a flat shape. Accordingly, the internal short circuit may be delayed by suppressing the dendrite formation due to the transition metal electrodeposition on the negative electrode surface during the overcharge.

In addition, when combined with the biphenyl-based compound, the cesium-based salt may prevent decomposition of an electrolyte and the resulting decomposition of the electrode and thus suppress an increase in internal resistance due to gas generation, thereby having an effect of suppressing additional exothermicity.

In particular, as confirmed in Table 1, Examples 1 and 2 including a biphenyl-based second compound along with the first compound according to the present invention exhibited much improved effects of suppressing the additional exothermicity, compared with Comparative Examples 7 and 8 including a phenyl-based second compound along with the first compound according to the present invention.

Referring to Table 1 and FIGS. 2 to 5, rechargeable battery cells including the composition according to an example embodiment as an additive more significantly exhibited the effect of delaying an internal short circuit, compared with rechargeable battery cells not including the additive.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. An electrolyte for a rechargeable lithium battery, comprising a non-aqueous organic solvent, a lithium salt, and an additive, wherein the additive includes a composition including a first compound and a second compound, the first compound is a cesium salt compound wherein an anion of the cesium salt compound is an imide-based anion or a phosphate-based anion, and the second compound is represented by Chemical Formula 1:

[Chemical Formula 1]

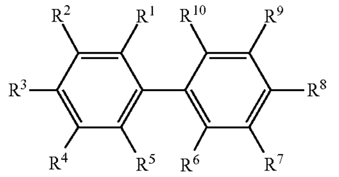

wherein, in Chemical Formula 1, $R^1$ to $R^{10}$ are each independently hydrogen, a halogen, a cyano group, a nitro group, an isocyanate group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C3 to C20 cycloalkenyl group, a substituted or unsubstituted C3 to C20 cycloalkynyl group, a substituted or unsubstituted C6 to C30 aryl group, a substituted or unsubstituted C2 to C30 heterocyclic group, a sulfate group ($—OSO_3R^a$), a sulfite group ($—OSO_2R^b$), a sulfonate group ($—SO_3R^c$), a sulfide group ($—SR^d$), an amine group ($—NR^eR^f$), an amide group ($—C(O)NR^gR^h$), or an acyl group ($—C(O)R^i$), wherein $R^a$, $R^b$, $R^c$, $R^d$, $R^e$, $R^f$, $R^g$, $R^h$, and $R^i$ are each independently hydrogen, or a substituted or unsubstituted C1 to C10 alkyl group.

2. The electrolyte for the rechargeable lithium battery of claim 1, wherein the cesium salt compound is represented by Chemical Formula 2 or Chemical Formula 3:

[Chemical Formula 2]

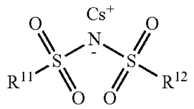

[Chemical Formula 3]

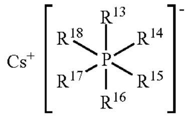

wherein, in Chemical Formula 2 and Chemical Formula 3, $R^{11}$ to $R^{18}$ are each independently a fluoro group or a C1 to C4 fluoroalkyl group substituted with at least one fluoro group.

3. The electrolyte for the rechargeable lithium battery of claim 2, wherein Chemical Formula 2 is represented by Chemical Formula 2-1 or Chemical Formula 2-2:

[Chemical Formula 2-1]

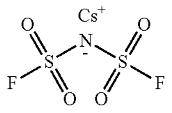

[Chemical Formula 2-2]

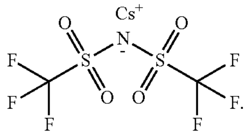

4. The electrolyte for the rechargeable lithium battery of claim 2, wherein Chemical Formula 3 is represented by Chemical Formula 3-1:

[Chemical Formula 3-1]

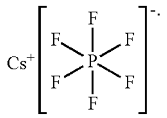

5. The electrolyte for the rechargeable lithium battery of claim 1, wherein the first compound is included in an amount of 0.05 to 5.0 parts by weight based on 100 parts by weight of the electrolyte for the rechargeable lithium battery.

6. The electrolyte for the rechargeable lithium battery of claim 1, wherein in Chemical Formula 1, $R^1$ to $R^{10}$ are each independently hydrogen, a halogen, a cyano group, a nitro group, an isocyanate group, a substituted or unsubstituted C1 to C20 alkyl group, a substituted or unsubstituted C3 to C20 cycloalkyl group, a substituted or unsubstituted C6 to C30 aryl group, a sulfate group ($—OSO_3R^a$), a sulfite group ($—OSO_2R^b$), a sulfonate group ($—SO_3R^c$), a sulfide group ($—SR^d$), an amine group ($—NR^eR^f$), an amide group ($—C(O)\ NR^gR^h$), or an acyl group ($—C(O)\ R^i$), wherein $R^a$, $R^b$, $R^c$, $R^d$, $R^e$, $R^f$, $R^g$, $R^h$, and $R^i$ are each independently hydrogen, or a substituted or unsubstituted C1 to C10 alkyl group.

7. The electrolyte for the rechargeable lithium battery of claim 1, wherein in Chemical Formula 1, $R^1$ to $R^{10}$ are each independently hydrogen, fluoro, a cyano group, a nitro group, an isocyanate group, a substituted or unsubstituted C1 to C10 alkyl group, a substituted or unsubstituted C6 to C12 aryl group, a sulfate group ($-OSO_3R^a$), a sulfite group ($-OSO_2R^b$), a sulfonate group ($-SO_3R^c$), a sulfide group ($-SR^d$), an amine group ($-NR^eR^f$), an amide group ($-C(O)NR^gR^h$), or an acyl group ($-C(O)R^i$), wherein $R^a$, $R^b$, $R^c$, $R^d$, $R^e$, $R^f$, $R^g$, $R^h$, and $R^i$ are each independently hydrogen, or a substituted or unsubstituted C1 to C5 alkyl group.

8. The electrolyte for the rechargeable lithium battery of claim 1, wherein the second compound is included in an amount of 0.1 to 10.0 parts by weight based on 100 parts by weight of the electrolyte for the rechargeable lithium battery.

9. The electrolyte for the rechargeable lithium battery of claim 1, wherein the composition includes the first compound and the second compound in a weight ratio of 1:0.1 to 1:30.

10. The electrolyte for the rechargeable lithium battery of claim 1, wherein the composition includes the first compound and the second compound in a weight ratio of 1:0.4 to 1:20.

11. The electrolyte for the rechargeable lithium battery of claim 1, wherein the composition is included in an amount of 0.5 to 10.0 parts by weight based on 100 parts by weight of the electrolyte for the rechargeable lithium battery.

12. A rechargeable lithium battery, comprising a positive electrode including a positive electrode active material;

a negative electrode including a negative electrode active material; and the electrolyte for the rechargeable lithium battery of claim 1.

13. The rechargeable lithium battery of claim 12, wherein the positive electrode active material is represented by Chemical Formula 6:

$$Li_xM^1_yM^2_zM^3_{1-y-z}O_{2-a}X_a \quad \text{[Chemical Formula 6]}$$

wherein, in Chemical Formula 6, $0.5 \le x \le 1.8$, $0 \le a \le 0.05$, $0 < y \le 1$, $0 \le z \le 1$, $0 \le y+z \le 1$, $M^1$, $M^2$, and $M^3$ each independently include at least one element selected from a metal of Ni, Co, Mn, Al, B, Ba, Ca, Ce, Cr, Fe, Mo, Nb, Si, Sr, Mg, Ti, V, W, Zr, or La, and a combination thereof, and X include at least one element selected from F, S, P, and Cl.

14. The rechargeable lithium battery of claim 13, wherein in Chemical Formula 6, $0.8 \le y \le 1$, $0 \le z \le 0.2$, $M^1$ are Ni.

15. The rechargeable lithium battery of claim 12, wherein the negative electrode active material is graphite or includes a Si composite and graphite together.

16. The rechargeable lithium battery of claim 15, wherein the Si composite include a core including Si-based particles and an amorphous carbon coating layer.

17. The rechargeable lithium battery of claim 16, wherein the Si-based particle includes one or more of a Si—C composite, $SiO_x$ ($0 < x \le 2$), and a Si alloy.

18. The rechargeable lithium battery of claim 17, wherein the Si—C composite includes a core including Si particles and crystalline carbon and an amorphous carbon coating layer on the surface of the core, and an average particle diameter of the Si particles is 50 nm to 200 nm.

* * * * *